(12) United States Patent  
Gatipon

(10) Patent No.: US 10,570,004 B2
(45) Date of Patent: Feb. 25, 2020

(54) BEVERAGE DISPENSER

(71) Applicant: THE COCA-COLA COMPANY, Atlanta, GA (US)

(72) Inventor: Shaun B. Gatipon, Kennesaw, GA (US)

(73) Assignee: The Coca-Cola Company, Atlanta, GA (US)

(*) Notice: Subject to any disclaimer, the term of this patent is extended or adjusted under 35 U.S.C. 154(b) by 602 days.

(21) Appl. No.: 15/120,342

(22) PCT Filed: May 13, 2015

(86) PCT No.: PCT/US2015/030469
§ 371 (c)(1),
(2) Date: Aug. 19, 2016

(87) PCT Pub. No.: WO2015/175598
PCT Pub. Date: Nov. 19, 2015

(65) Prior Publication Data
US 2017/0066638 A1 Mar. 9, 2017

Related U.S. Application Data

(60) Provisional application No. 61/993,463, filed on May 15, 2014.

(51) Int. Cl.
B67D 1/08 (2006.01)
B67D 1/00 (2006.01)
(Continued)

(52) U.S. Cl.
CPC ......... *B67D 1/0888* (2013.01); *B67D 1/0007* (2013.01); *B67D 1/0025* (2013.01);
(Continued)

(58) Field of Classification Search
CPC .. B67D 1/0007; B67D 1/0025; B67D 1/0888; G06F 3/0482
See application file for complete search history.

(56) References Cited

U.S. PATENT DOCUMENTS 5,797,519 A 8/1998 Schroeder et al.
2004/0045984 A1 3/2004 Schuman et al.
(Continued)

FOREIGN PATENT DOCUMENTS

EP 1983312 A1 10/2008

OTHER PUBLICATIONS

Allen, "RFID revolutionises dispensers," Aug. 10, 2009, https://www.manmonthly.com.au/news/rfid-revolutionises-dispensers/.*
(Continued)

*Primary Examiner* — Ryan Barrett
(74) *Attorney, Agent, or Firm* — Eversheds Sutherland (US) LLP

(57) ABSTRACT

A beverage dispenser is disclosed herein. The beverage dispenser may include a housing configured to house at least one beverage container therein. The beverage container may include an identification tag associated therewith. At least one identification tag reader may be disposed within the housing. The identification tag reader may be configured to detect the identification tag associated with the beverage container. The beverage dispenser also may include a user interface disposed about an exterior of the housing. The user interface may include at least one beverage identification area that corresponds to the beverage container. At least one controller may be in communication with the at least one identification tag reader and the user interface. The controller may be configured to update the beverage identification area based at least in part on the identification of the beverage container by the identification tag reader.

3 Claims, 7 Drawing Sheets

(51) Int. Cl.
*G06F 3/0482* (2013.01)
*G06F 9/451* (2018.01)
*B67D 1/12* (2006.01)
*B67D 3/00* (2006.01)

(52) U.S. Cl.
CPC ......... *B67D 1/0037* (2013.01); *B67D 1/0877* (2013.01); *B67D 1/0878* (2013.01); *B67D 1/1231* (2013.01); *G06F 3/0482* (2013.01); *G06F 9/451* (2018.02); *B67D 1/0004* (2013.01); *B67D 3/00* (2013.01); *B67D 2210/00091* (2013.01)

(56) References Cited

U.S. PATENT DOCUMENTS

| | | | |
|---|---|---|---|
| 2007/0164046 A1* | 7/2007 | Nighy | B67D 1/0025 222/129.1 |
| 2007/0191983 A1* | 8/2007 | Griffits | A47G 19/2227 700/213 |
| 2009/0069925 A1* | 3/2009 | Dattolo | A47J 31/40 700/114 |
| 2009/0069930 A1* | 3/2009 | Peters | B67D 1/0041 700/236 |
| 2009/0069934 A1* | 3/2009 | Newman | B67D 1/0021 700/239 |
| 2009/0069949 A1 | 3/2009 | Carpenter et al. | |
| 2009/0218365 A1 | 9/2009 | Taradalsky et al. | |
| 2009/0277516 A1* | 11/2009 | Winkler | G05D 7/0635 137/486 |
| 2010/0024915 A1 | 2/2010 | Thomas et al. | |
| 2011/0016910 A1* | 1/2011 | Bak | F25D 29/00 62/449 |
| 2011/0147194 A1* | 6/2011 | Kamen | B01D 1/0082 202/185.1 |
| 2011/0181417 A1* | 7/2011 | Haskayne | B67D 1/0021 340/572.1 |
| 2013/0106690 A1* | 5/2013 | Lim | G07F 13/065 345/156 |
| 2013/0314244 A1* | 11/2013 | Hershberger | G01D 4/002 340/870.02 |
| 2014/0114469 A1* | 4/2014 | Givens | B67D 1/0041 700/232 |
| 2014/0166694 A1* | 6/2014 | Otto | B67D 1/0001 222/95 |
| 2014/0220184 A1* | 8/2014 | Boggs | B65D 81/02 426/87 |
| 2014/0263454 A1* | 9/2014 | Connerat | B67D 1/0078 222/153.06 |
| 2015/0027315 A1* | 1/2015 | Lussi | A47J 31/401 99/285 |
| 2016/0325980 A1* | 11/2016 | Sawhney | G06Q 30/06 |
| 2017/0101302 A1* | 4/2017 | Quartarone | G06K 7/10356 |
| 2019/0272068 A1* | 9/2019 | Newman | G06F 3/04883 |

OTHER PUBLICATIONS

Ricoh, "Checking the remaining ink level on the display," 2012, http://support.ricoh.com/bb_v1oi/pub_e/oi_view/0001045/0001045157/view/op_guide/int/0338.htm.*

International Search Report and Written Opinion for International Application No. PCT/US2015/030469 dated Aug. 13, 2015.

* cited by examiner

BEVERAGE DISPENSER

CROSS-REFERENCE TO RELATED APPLICATIONS

The disclosure claims priority to and the benefit of U.S. provisional patent application No. 61/993,463, filed May 15, 2014, which is herein incorporated by reference in its entirety.

FIELD OF THE DISCLOSURE

The disclosure generally relates to beverage dispensers and more particularly relates to systems and methods for, among other things, updating a user interface and modifying one or more dispensing parameters of a beverage dispenser.

BACKGROUND

Typical beverage dispensers are configured to dispense a specific type of beverage, such as soda, tea, coffee, etc. When a new beverage or beverage ingredients are loaded into the beverage dispenser, the beverage dispenser may not be configured to properly prepare a beverage suitable for consumption. Moreover, the beverage dispenser may not include the proper graphics and advertising associated with the new beverage. This is problematic because there is a need to provide a beverage dispenser that is capable of having different beverage options at different times of the day or based on other parameters.

SUMMARY

Some or all of the above needs and/or problems may be addressed by certain embodiments of the beverage dispenser disclosed herein. For example, the beverage dispenser may include a housing configured to house at least one beverage container therein. The beverage container may include an identification tag associated therewith. At least one identification tag reader may be disposed within the housing. The identification tag reader may be configured to detect the identification tag associated with the beverage container. The beverage dispenser also may include a user interface disposed about an exterior of the housing. The user interface may include at least one beverage identification area that corresponds to the beverage container. At least one controller may be in communication with the at least one identification tag reader and the user interface. The controller may be configured to update the beverage identification area based at least in part on the identification of the beverage container by the identification tag reader.

In another embodiment, a method of updating a user interface of a beverage dispenser is disclosed. The method may include inserting a beverage container into a housing of the beverage dispenser. The method also may include selecting a beverage ingredient from a list of beverage ingredients that corresponds to a beverage ingredient within the beverage container and a location of the beverage container within the housing. Moreover, the method may include updating, based at least in part on the selected beverage ingredient associated with the beverage container and the location of the beverage container within the housing, the user interface.

Other features and aspects of the beverage dispenser will be apparent or will become apparent to one with skill in the art upon examination of the following figures and the detailed description. All other features and aspects, as well as other systems, methods, and assembly embodiments, are intended to be included within the description and are intended to be within the scope of the accompanying claims.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Described below are example embodiments of a beverage dispenser (as well as individual components of the beverage dispenser). The beverage dispenser may be used to dispense various beverages to consumers. The beverage dispenser may be used in any suitable application. In some instances, the beverage dispenser may provide a technical effect and/or solution, among others, of automatically determining a beverage ingredient contained in a beverage container that is inserted into the beverage dispenser. In other instances, an operator, such as a stocker, a stock clerk, or the like, may insert the beverage container into the beverage dispenser. The operator also may indicate the beverage ingredient in the beverage container. For example, the operator may select a beverage ingredient on a user interface or the like from a list of beverage ingredients. The selected beverage ingredient from the list of beverage ingredients may correspond to the beverage ingredient in the beverage container. Based on the beverage ingredient in the beverage container, as indicated by the operator or automatically determined by the beverage dispenser, the beverage dispenser may automatically update a user interface, modify a mixing or dispensing parameter of the beverage ingredient, and/or determine and monitor a level of the beverage ingredient in the beverage container. Other technical effects and/or solutions may become apparent throughout the disclosure.

These and other embodiments of the beverage dispenser will be described in more detail through reference to the accompanying drawings. The techniques described above and below may be implemented in a number of ways and in a number of contexts. Several example implementations and contexts are provided with reference to the following figures, as described below in more detail. However, the following implementations and contexts are but a few of many.

Figure 1:
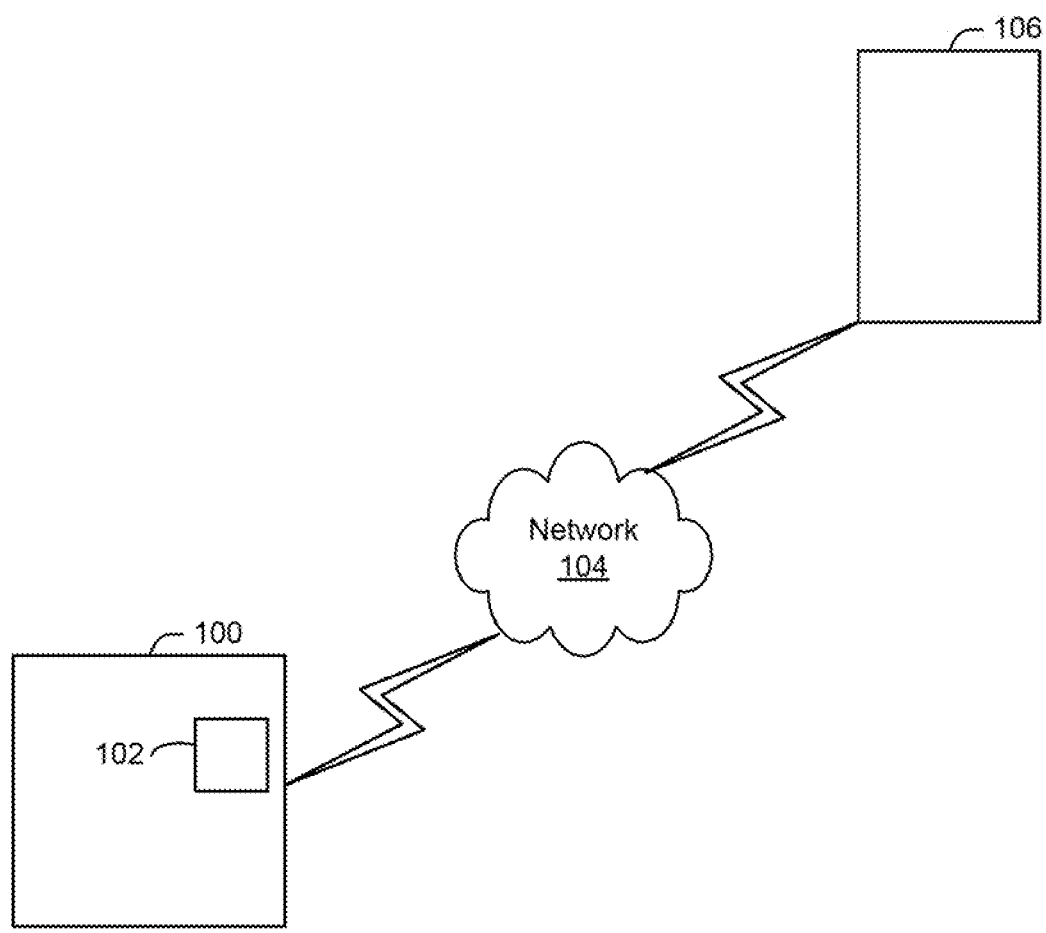
FIG. 1 schematically depicts a beverage dispenser system in accordance with one or more embodiments of the disclosure.

As depicted in FIG. 1, a beverage dispenser 100 may include a network interface 102. The network interface 102 may be in communication with one or more computers 106 (or servers) over a network 104. The network 104 may include any one or a combination of multiple different types of networks, such as cable networks, the Internet, wireless networks, and other private and/or public networks. In this manner, the network interface 102 may allow the computers 106 (or servers) to access, receive from, transmit to, or otherwise interact with the beverage dispenser 100 via the network 104. The beverage dispenser 100 may be in communication with other beverage dispensers, other computers, original equipment manufacturers, third party vendors, etc. over the network 104. The beverage dispenser 100 may be in communication with any number of devices over the network 104.

Figure 2:
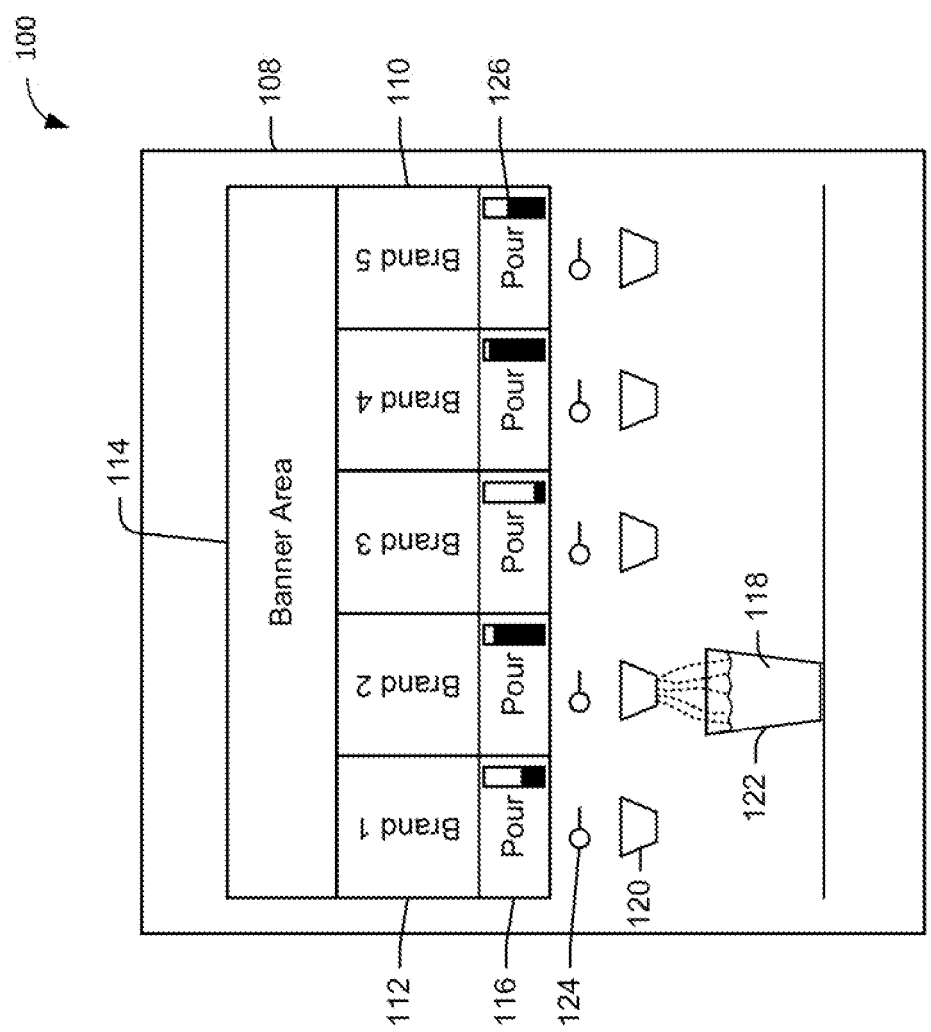
FIG. 2 schematically depicts a beverage dispenser in accordance with one or more embodiments of the disclosure.

Turning now to FIG. 2, the beverage dispenser 100 may include a housing 108. The housing 108 may include a user interface 110. In some instances, the user interface 110 may include a digital display, such as a touch screen display or the like. Any type of display or screen (interactive or static) may be used. The user interface 110 may be disposed about an exterior of the housing 108 such that it is visible by one or more consumers. The user interface 110 also may be a mechanical interface with push buttons or the like.

The user interface 110 may include a number of beverage identification areas 112. The beverage identification areas 112 may include a beverage icon or trademark. For example, one of the beverage identification areas 112 may include the trademark COCA-COLA® ("COCA-COLA" is a trademark of the Coca-Cola Company of Atlanta, Ga.) to indicate that such a beverage may be dispensed by the beverage dispenser 100. The other beverage identification areas 112 may include other beverage indicia to indicate other beverages that may be dispensed by the beverage dispenser 100. As discussed in greater detail below, each of the beverage identification areas 112 may correspond to one or more beverage containers 128 within the housing 108.

The user interface 110 also may include a banner area 114 for advertising and/or displaying one or more messages or other indicia. In addition, the user interface 110 may include a pour button 116 configured to be engaged by a consumer to dispense a beverage 118 from the beverage dispenser 100. For example, when a user presses the pour button 116, a beverage ingredient from the beverage container 128 within the housing 108 may be pumped to a nozzle 120, which may mix the beverage ingredient with water (still or carbonated) or other beverage ingredients to form the beverage 118. The beverage 118 may then be dispensed into a container 122. Example nozzles 120 that may be used herein are disclosed in U.S. Provisional Application No. 61/941,113, which is hereby incorporated by reference in its entirety. The pour button 116 may be positioned elsewhere on the housing 108. In some instances, the pour button 116 may be omitted.

By way of example, the beverage ingredient may be a concentrate, a syrup, a slurry, a carbonated beverage concentrate, a juice or juice mixture, a flavor component, a high pulp juice, a high viscosity fluid, a vitamin concentrate, enhanced water, a low viscosity fluid, a product containing particulate, a dairy product, a yogurt, water, or any combination or derivative thereof. The beverage ingredient may be any suitable beverage ingredient or combination of beverage ingredients. In some instances, the beverage ingredient may be ready-to-drink. That is, the beverage ingredient may not be mixed with water or other ingredients before serving.

In some instances, alternatively or in addition to the pour button 116, the beverage dispenser 100 may include a dispensing mechanism 124 configured to be engaged by a consumer to dispense the beverage 118 from the beverage dispenser 100. In some instances, the dispensing mechanism 124 may be a lever, a dial, a knob, etc. Any mechanical or electrometrical device may be used to initiate the dispensing of the beverage 118. For example, when a user manipulates the dispensing mechanism 124, a beverage ingredient from the beverage container 128 within the housing 108 may be pumped to the nozzle 120, which may mix the beverage ingredient with water or other beverage ingredients to form the beverage 118. The dispensing mechanism 124 may be disposed upstream or downstream of the nozzle 120. In some instances, the dispensing mechanism 124 may be omitted.

The user interface 110 may include a beverage level indicator 126. The beverage level indicator 126 may be configured to provide a visual indicator to a user. For example, the beverage level indicator 126 may illustrate the amount of beverage ingredient remaining in the beverage container 128. The beverage level indicator 126 may include any gauge or the like (such as, e.g., a fuel gauge-like display) that provides a visual indicator of the level of beverage ingredient remaining in the beverage container 128.

Figure 3:
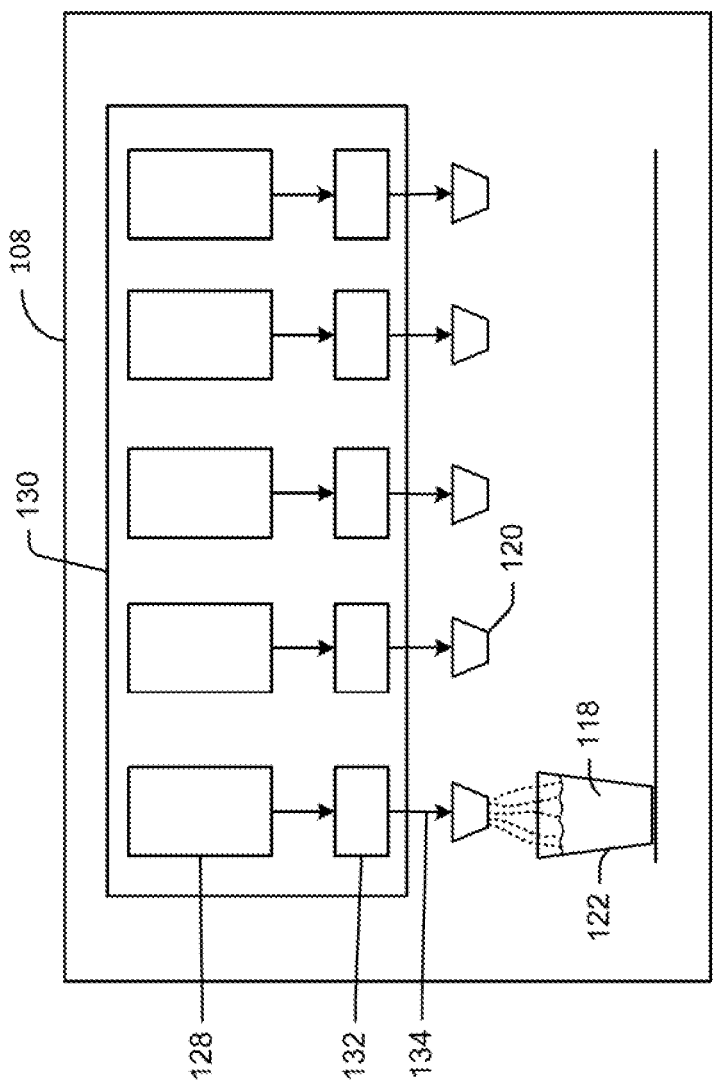
FIG. 3 schematically depicts a beverage dispenser in accordance with one or more embodiments of the disclosure.

As depicted in FIG. 3, the housing 108 may be configured to store at least one beverage container 128 therein. In some instances, a number of beverage containers 128 may be disposed within the housing 108. For example, the housing 108 may include at least one temperature controlled compartment 130 configured to maintain the beverage containers 128 at a desired temperature. The temperature controlled compartment 130 may be in communication with one or more refrigeration devices, heating devices, or the like. The temperature controlled compartment 130 may be maintained at any temperature, cold or hot. In some instances, the temperature controlled compartment 130 may be insulated. The temperature of the temperature controlled compartment 130 may depend on the beverage ingredients stored in the beverage containers 128. In some instances, all of the beverage containers 128 may be stored in a single temperature controlled compartment 130. For example, the temperature controlled compartment 130 may include a number of slots or stalls, with each beverage container 128 being disposed within a separate slot or stall. In other instances, the housing 108 may include a number of temperature controlled compartments 130, with each beverage container 128 being disposed within a separate temperature controlled compartment 130. In such instances, each temperature controlled compartment 130 may be maintained at a temperature that is suitable for the beverage container 128 stored therein.

Figure 4:
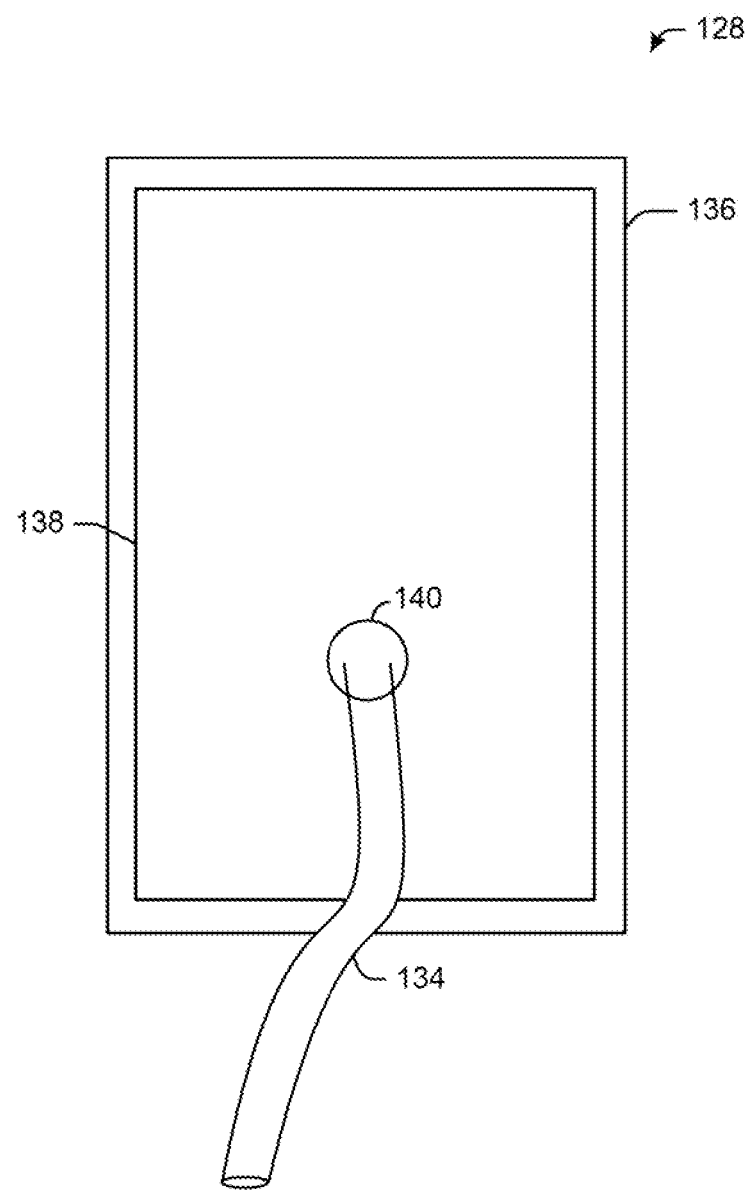
FIG. 4 schematically depicts a beverage container in accordance with one or more embodiments of the disclosure.

In certain embodiments, at least one pump 132 may be in communication with each beverage container 128 and a corresponding nozzle 120. In this manner, the pump 132 may be configured to pump the beverage ingredient from the beverage container 128 to the nozzle 120. For example, the pump 132 may be a peristaltic pump, although any type of pump may be used herein. Tubing 134 may pass from the beverage container 128 through the pump 132 and connect to the nozzle 120. For example, as depicted in FIG. 4, each beverage container 128 may include an exterior carton portion 136, an interior bag portion 138 disposed within the exterior carton portion 136, and a tubing portion 134 in communication with the interior bag portion 138. The tubing portion 134 may pass through the exterior carton portion 136 by way of an aperture 140 in the exterior carton portion 136. In some instances, the tubing portion 134 may be at least partially disposed within the peristaltic pump. Moreover, an end of the tubing portion 134 may be cut and attached to the nozzle 120.

Figure 5:
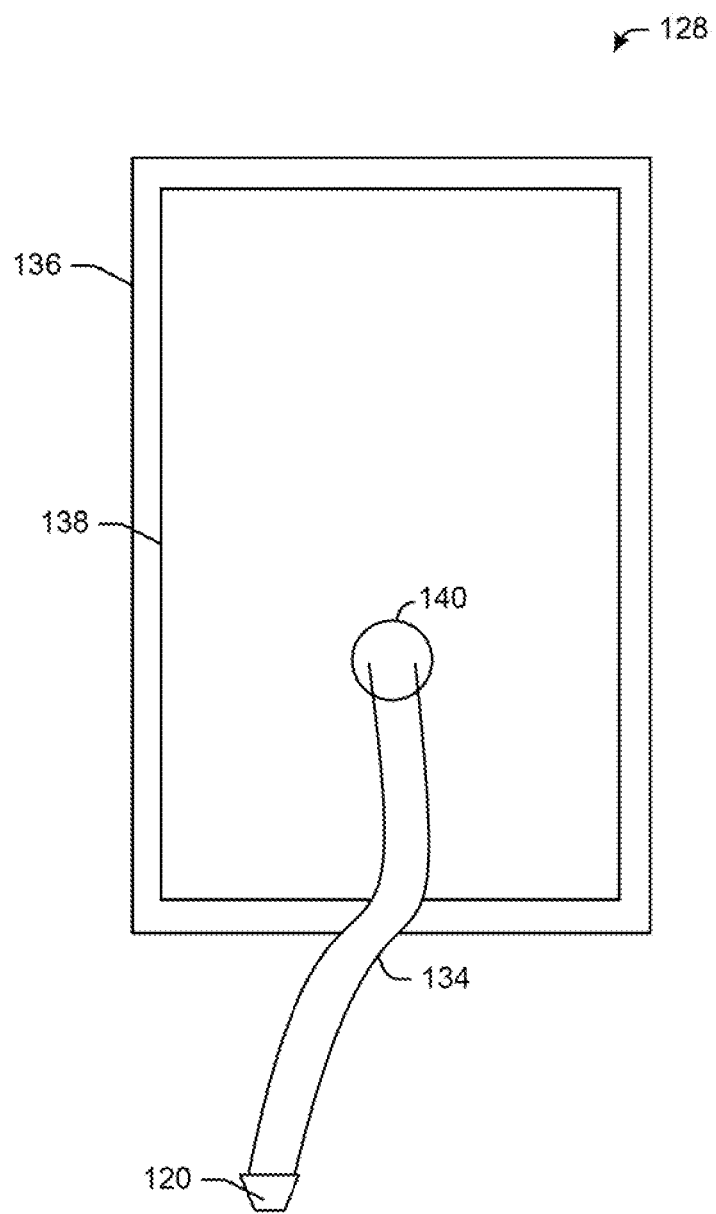
FIG. 5 schematically depicts a beverage container in accordance with one or more embodiments of the disclosure.

FIG. 5 depicts a beverage dispenser 128 with a nozzle 120 attached to the tubing portion 132. The beverage container 128 may include an exterior carton portion 136, an interior bag portion 138, and a tubing portion 134. The tubing portion 134 may pass through the exterior carton portion 136 by way of an aperture 140. The tubing portion 134 may be attached to a nozzle 120. In some instances, the nozzle 120 may be disposable. The nozzle 120 may be installed or removed from the housing 108 when the beverage container 128 is installed or removed from the housing 108. In certain embodiments, the connection between the tubing portion 134 and the nozzle 120 may include a built-in check valve or the like to prevent spills when the beverage container 128 is installed or replaced. The nozzle 120 being disposable and attached to the tubing portion 134 prevents cross-contamination. For example, the beverage container 128 and the associated nozzle 120 may be installed or removed quickly without worry of cross-contamination with other products.

In some instances, a manifold or the like may be in communication with the tubing portion 134. The manifold may enable the mixing of two or more beverage ingredients with water or other beverage ingredients to form the beverage 118. The manifold may be disposed upstream or downstream of the pump 132.

Figure 6:
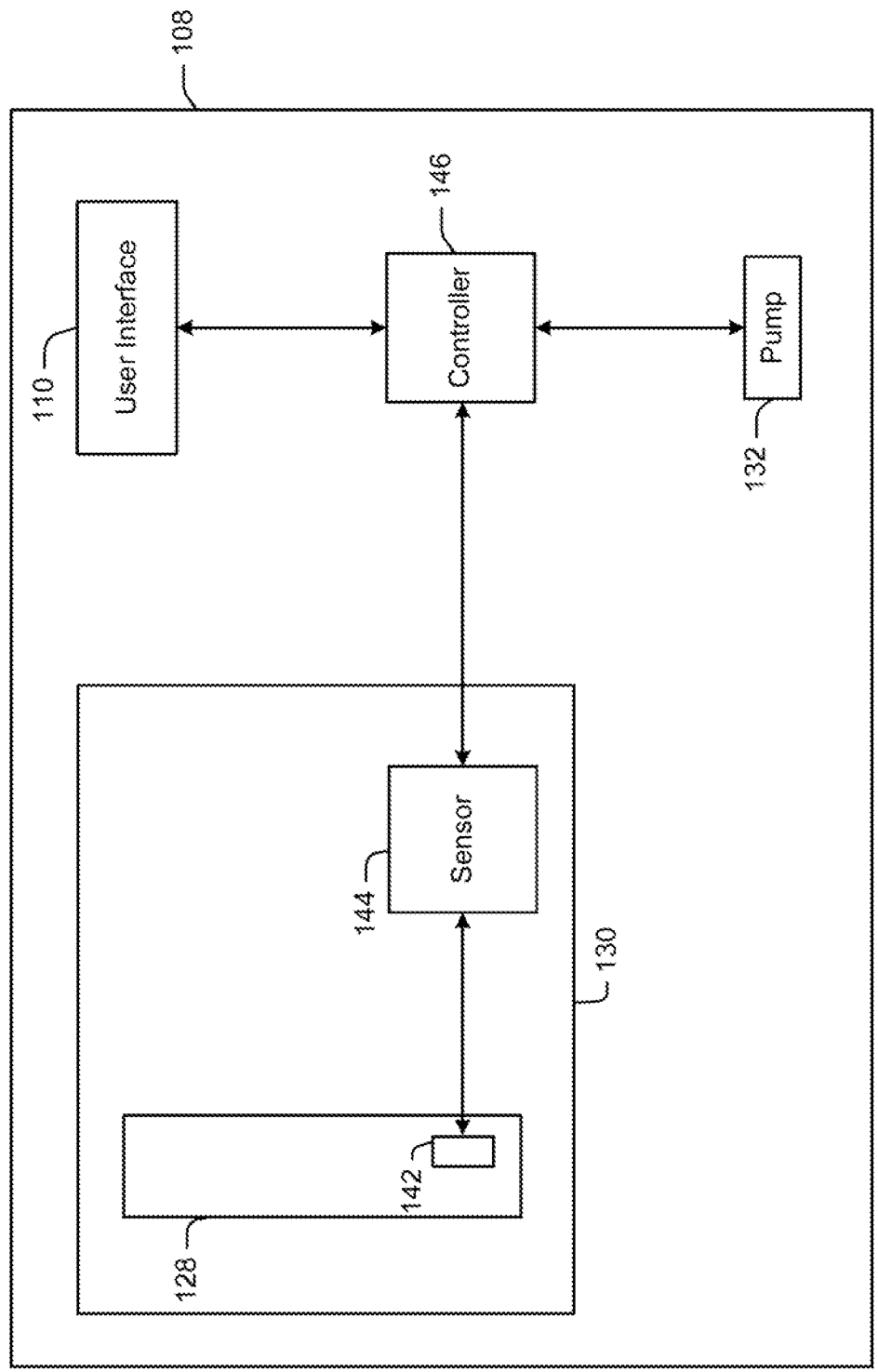
FIG. 6 schematically depicts a beverage dispenser in accordance with one or more embodiments of the disclosure.

As depicted in FIG. 6, the beverage container 128 also may include at least one identification tag 142. In some instances, the identification tag 142 may be a passive device (such as an RFID tag) or an active device (such as an integrated circuit (IC) chip). The identification tag 142 may be any device, including but not limited to, an RFID tag, a QR code, a bar code, an IC chip, a processor coupled to a memory, an icon, a graphic or other detectable pattern, etc. The identification tag 142 may convey information about the beverage container 128. For example, the identification tag 142 may convey, among other things, the contents of the beverage container 128, the volume of the beverage container 128, and/or an amount of beverage ingredient remaining in the beverage container 128. Any information may be conveyed by the identification tag 142. In certain embodiments, information may be stored on the identification tag 142. In some instances, the identification tag 142 may be omitted.

In some instances, at least one identification tag reader 144 may be disposed within the housing 108. For example, the identification tag reader 144 may be disposed within the temperature controlled compartment 130. The identification tag reader 144 may be disposed at any suitable location about the housing 108. The identification tag reader 144 may be configured to detect the identification tag 142 associated with the beverage container 142. In some instances, the identification tag reader 144 may be a bar code reader, an RFID tag sensor, a camera, a laser sensor, etc. Any sensor capable of detecting the identification tag 142 may be used herein. The identification tag reader 144 may be capable of sensing the location of the beverage container 128 as well as reading the identification tag 142. The identification tag reader 144 may detect the location of the one or more of beverage containers 128 as well as read the identification tag 142 of one or more of beverage containers 128. In some instances, a number of identification tag readers 144 may be disposed within the housing 108. For example, each temperature controlled compartment 130 may include an identification tag reader 144. In some instances, the identification tag reader 144 may be omitted.

The beverage dispenser 100 may include at least one controller 146. The controller 146 may include a processor coupled to a memory. The controller 146 may be any type of programmable computing device. The controller 146 may be in communication with the identification tag reader 144 and the user interface 110. In this manner, the controller 146 may be configured to update the beverage identification area 112 of the user interface 110 based at least in part on the information provided by the identification tag reader 144. That is, the identification tag reader 144 may detect the beverage container 128 within the housing 108 by way of the identification tag 142. The identification tag 142 (via the identification tag reader 144) may convey to the controller 146 information about the beverage container 128. For example, the identification tag 142 may identify the contents of the beverage container 128. Based on this information, the controller 146 may update (or change) the beverage identification area 112 of the user interface 110 that corresponds to the location of the detected beverage container 128. In this manner, the user interface 110 may automatically update the display when one or more beverage containers 128 are loaded and/or unloaded into the beverage dispenser 100.

The controller 146 also may be in communication with the pump 132. In this manner, the controller 146 may be configured to adjust a pumping (or dispensing) speed of the beverage 118 based at least in part on the information provided by the identification tag 142. Any parameter associated with the operation or dispensing of the beverage 118 may be adjusted or modified based on the information provided by the identification tag 142. For example, the temperature of the temperature controlled compartment 130 may be lowered or raised based on the information provided by the identification tag 142. In addition, the pumping speed and/or mixing rate of the beverage ingredients may be modified based on the information provided by the identification tag 142. Furthermore, the combination of the beverage ingredients with water or other components may be modified based on the information provided by the identification tag 142.

In some instances, the information provided by the identification tag 142 may include an expiration date or the ability to determine an expiration date. For example, the date that the beverage container 128 is first opened and/or installed in the beverage dispenser 100 may be stored on the controller 146, transmitted and saved on a remote server via the network 104, and/or uploaded to the identification tag 142. In this manner, the first date that the beverage container 128 is opened and/or installed in the beverage dispenser 100 can be tracked. Based on this information, the expiration of the beverage ingredients within the beverage container 128 may be determined. For example, some beverage ingredients may expire a few days after being opened.

In certain embodiments, the controller 146 may be configured to determine an amount of beverage ingredient in the beverage container 128. For example, U.S. Provisional Application No. 61/946,616, which is hereby incorporated by reference in its entirety, describes systems and methods for determining an amount of beverage ingredient in the beverage containers 128. In some instances, the amount of beverage ingredient in the beverage container 128 may be determined by subtracting the amount of beverage ingredient dispensed from the beverage container 128 from a known starting volume of the beverage container 128. For example, as noted above, the pump 132 may be a peristaltic pump, which pumps by way of positive displacement. In this manner, each cycle of the peristaltic pump may dispense a known amount of beverage ingredient from the beverage container 128, which may be subtracted from an initial amount. In addition, as the pump 132 dispenses the beverage ingredient, the corresponding beverage level indicator 126 on the user interface 110 may be adjusted accordingly. Other types of feedbacks, such as motor pulses and the like may be used.

In some instances, the remaining beverage ingredient in the beverage container 128 may be tracked. For example, the remaining amount may be stored on the controller 146, transmitted and saved on a remote server via the network 104, and/or uploaded to the identification tag 142. In this manner, as the beverage container 128 is loaded and unloaded into various beverage dispensers, the remaining amount of beverage ingredient in each beverage container 128 may be determined.

In certain embodiments, the tubing portion 134 may be removed from the exterior carton portion 136 of the beverage container 128. The beverage container 128 may then be placed within the housing 108. For example, the beverage dispenser 128 may be placed with the temperature controlled compartment 130. Next, the tubing portion 134 may be at least partially disposed within the pump 132. At this point, an end of the tubing portion 134 may be cut, and the tubing portion 134 may be attached to the nozzle 120, if not already attached.

Information associated with the beverage container 128 may be determined when the beverage container 128 is placed within the housing 108. For example, the identification tag 142 attached to the beverage container 128 may be read by the identification tag reader 144. Based on the information provided by the identification tag 142, the controller 146 may update (or change) the beverage identification area 112 of the user interface 110 that corresponds to the location of the detected beverage container 128. In addition, the controller 146 may determine an amount of beverage ingredient remaining within the beverage container 128. Moreover, one or more parameters associated with the operation and/or dispensing of the beverage 118 may be adjusted or modified based on the information provided by the identification tag 142. For example, the temperature of the temperature controlled compartment 130 may be lowered or raised, the pumping speed and/or mixing rate of the beverage ingredients may be modified, and/or the combination of the beverage ingredients with water or other components may be modified based on the information provided by the identification tag 142. The controller 146 also may determine whether the beverage container 128 is authorized for use, beyond an expiration date, or any other parameter.

Figure 7:
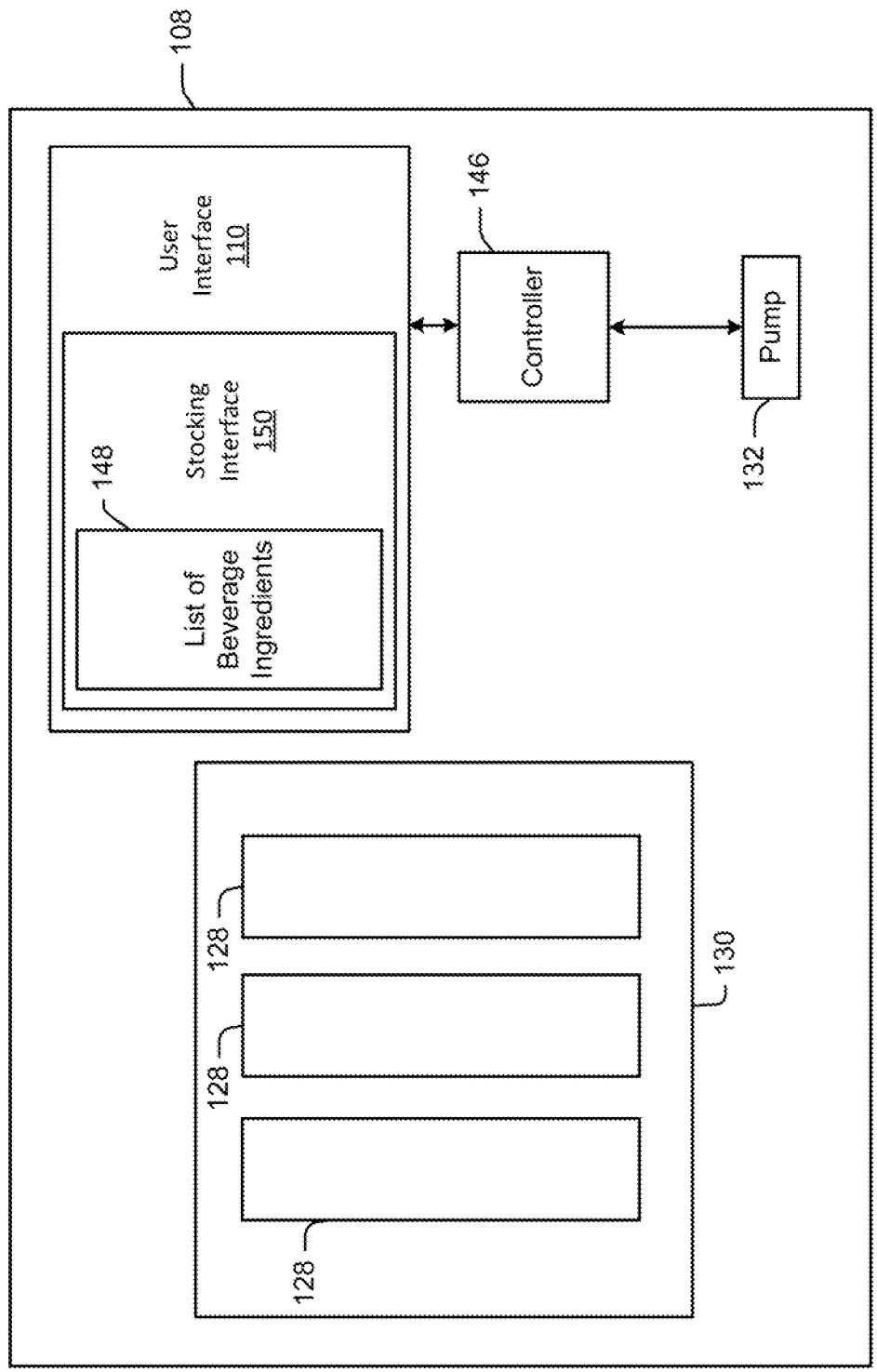
FIG. 7 schematically depicts a beverage dispenser in accordance with one or more embodiments of the disclosure.

In another embodiment, an operator, such as a stocker, a stock clerk, or the like, may indicate the beverage ingredient in the beverage container 128. For example, as depicted in FIG. 7, the operator may insert the beverage container 128 into the housing 108 and select a beverage ingredient from a list of beverage ingredients 148 on a stocking interface 150 (which may include a stocking mode or the like). In some instances, the inside of the housing 108 may include the stocking interface 150, which may be a touch screen or the like, in communication with the controller 146. The stocking interface 150 may be accessible by the operator during loading and unloading of the beverage containers 128 and may include the list of selectable beverage ingredients 148. Any suitable interface in communication with the controller 146 may be used. For example, the stocking interface 150 may be incorporated into and form part of the user interface 110 discussed above. That is, the stocking interface 150 and the user interface 110 may be consolidated into a single component. In this manner, the user interface 110 may be a touch screen or the like on the outside of the housing 108 and may include the stocking interface 150, which may comprise a stocking mode or application accessible by the operator. In such instances, the operator may indicate the beverage ingredient in the beverage container 128 by entering or selecting a beverage ingredient from the list of beverage ingredients 148, which may be presented to the operator on the user interface 110.

The selected beverage ingredient from the list of beverage ingredients 148 may correspond to the beverage ingredient in the beverage container 128 and the location of the beverage container 128 within the housing 108. For example, if one of the beverage containers 128 includes DIET COKE® beverage ingredients, the operator may insert the beverage container 128 into, for example, stall one of the temperature controlled compartment 130 within the housing 108 and select DIET COKE® from the list of selectable beverage ingredients associated within stall one. In other instances, the operator may input via the stocking interface 150 that the beverage container 128 is located in stall one. This process may be repeated for each beverage container 128 inserted into the housing 108. The operator also may provide additional information about each beverage container 128 via the stocking interface 150, such as an expiration date or the like. In such instances, the identification tag 142 and/or the identification tag reader 144 may be included or omitted.

The controller 146 may be configured to update the beverage identification area 112 of the user interface 110 based at least in part on the information provided by the operator by way of the stocking interface 150. For example, the controller 146 may update (or change) the beverage identification area 112 of the user interface 110 that corresponds to the location of the beverage container 128 inputted by the operator. In this manner, the user interface 110 may automatically update the display when one or more beverage containers 128 are loaded into the beverage dispenser 100 and identified by the operator.

The controller 146 also may be in communication with the pump 132. In this manner, the controller 146 may be configured to adjust a pumping (or dispensing) speed of the beverage 118 based at least in part on the information provided by the operator. Any parameter associated with the operation or dispensing of the beverage 118 may be adjusted or modified based on the information provided by the operator. For example, the temperature of the temperature controlled compartment 130 may be lowered or raised based on the information provided by the operator. In addition, the pumping speed and/or mixing rate of the beverage ingredients may be modified based on the information provided by the operator. Furthermore, the combination of the beverage ingredients with water or other components may be modified based on the information provided by the operator.

Information associated with the beverage container 128 may be inputted via stocking interface 150 when the beverage container 128 is placed within the housing 108. For example, based on the information provided by the operator, the controller 146 may update (or change) the beverage identification area 112 of the user interface 110 that corresponds to the location of the detected beverage container 128. In addition, one or more parameters associated with the operation and/or dispensing of the beverage 118 may be adjusted or modified based on the information provided by the operator. For example, the temperature of the temperature controlled compartment 130 may be lowered or raised, the pumping speed and/or mixing rate of the beverage ingredients may be modified, and/or the combination of the beverage ingredients with water or other components may be modified based on the information provided by the operator.

Although specific embodiments of the disclosure have been described, numerous other modifications and alternative embodiments are within the scope of the disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A beverage dispenser, comprising:
    a housing configured to house at least one beverage container therein;
    a plurality of temperature controlled compartments within the housing, wherein each temperature controlled compartment comprises a heating element and a refrigeration element;
    a user interface disposed about the housing, wherein the user interface comprises:
        a plurality of beverage identification areas, each disposed adjacent to each beverage container; and
        an incremental beverage level indicator disposed adjacent to the digital beverage identification areas; and
    a stocking interface comprising a list of beverage ingredients; and
    at least one controller in communication with the stocking interface and the user interface, wherein the at least one controller is configured to update the at least one beverage identification area based at least in part on a beverage ingredient selected from the list of beverage ingredients that corresponds to a beverage ingredient within the at least one beverage container and a location of the at least one beverage container within the housing.

2. The beverage dispenser of claim 1, wherein the at least one controller is configured to adjust one or more operating and/or dispensing parameters of the beverage dispenser based at least in part on the selected beverage ingredient associated with the at least one beverage container.

3. The beverage dispenser of claim 1, wherein the at least one controller is configured to adjust a dispensing speed based at least in part on the selected beverage ingredient associated with the at least one beverage container.

* * * * *